United States Patent
Lehmann et al.

[11] Patent Number: 5,840,174
[45] Date of Patent: Nov. 24, 1998

[54] PROCESS FOR THE PURIFICATION OF GASES

[75] Inventors: Thomas Lehmann, Langenselbold; Dieter Engel, Rheinfelden; Rainer Sanzenbacher, Gelnhausen, all of Germany

[73] Assignee: Degussa Aktiengesellschaft, Frankfurt, Germany

[21] Appl. No.: 705,627

[22] Filed: Aug. 30, 1996

[30] Foreign Application Priority Data

Aug. 30, 1995 [DE] Germany ............... 195 31 707.6

[51] Int. Cl.$^6$ ................................................. B01D 53/00
[52] U.S. Cl. .................... 205/763; 205/765; 423/241; 588/204
[58] Field of Search ............................. 205/763, 765; 423/241; 588/204

[56] References Cited

U.S. PATENT DOCUMENTS 4,004,993  1/1977  Horner et al. ..................... 205/763

FOREIGN PATENT DOCUMENTS 29 01 577  7/1980  Germany.

OTHER PUBLICATIONS

Gerhard Kreysa, et al. "A New Electrochemical Gas Purification Process," *Ger. Chem. Eng. 6* (1983), pp. 325–336. No month provided.

Kreysa et al. "A New Electrochemical Gas Purification Process" 1983 pp. 325–336. (No month).

Primary Examiner—Arun S. Phasge
Attorney, Agent, or Firm—Beveridge, DeGrandi, Weilacher & Young, LLP

[57] ABSTRACT

A process for the electrolytic removal of contaminants from gases, wherein a gas and a liquid electrolyte are passed co- or counter-currently through a fixed bed electrode of an electrolysis cell which has a counterelectrode separated from the fixed bed electrode by a separator and the contaminant is electrochemically converted at an effective cell voltage. Such cells have hitherto been operated in a flooded state. The degree of purification may be substantially increased if the fixed bed electrode is operated as a trickle bed reactor.

19 Claims, 2 Drawing Sheets

PROCESS FOR THE PURIFICATION OF GASES

INTRODUCTION AND BACKGROUND

This invention relates to a process for the purification of gases by electrolytic removal of contaminants from gases using an electrolysis cell with a fixed bed electrode.

Gaseous pollutants or contaminants in gases, such as $Cl_2$, $SO_2$, $NO_x$, may be removed by wet chemical scrubbing with a scrubbing solution. Absorption equipment, such as packed columns, are used for such purification operations. In order to ensure effective purification, the absorbed gas component must be rapidly reacted. One disadvantage is the necessity of using suitable chemicals. Moreover, the reaction product formed in the scrubbing solution often converts a waste gas problem into a waste water problem.

Electrochemical waste gas purification processes are also known. In the so-called "outer cell" process, the gas component to be depleted in the waste gas is first absorbed in a scrubbing solution in an absorption column; the scrubbing solution is then cathodically reduced or anodically oxidized in a downstream electrolysis cell. This arrangement requires two pieces of equipment, namely one for absorption and one for electrolysis. So-called "inner cell" processes, wherein absorption and electrochemical conversion proceed in a single reactor, namely an electrolysis cell, are more advantageous. In so-called "indirect" electrolysis processes, the oxidizing or reducing agent used in a wet chemical waste gas treatment is regenerated by electrolysis of the spent scrubbing solution.

One "inner cell" process which is suitable for oxidative or reductive electrolytic waste gas purification is described by G. Kreysa et al. in Ger. Chem. Eng. 6 (1983) 325–336 which is incorporated herein by reference: the gas to be purified is brought into contact with an electrolytically conductive scrubbing liquid in an absorption column arranged as a fixed bed electrode. The absorption column contains a bed of conductive packing. The gas to be purified and the scrubbing liquid may be passed through the column co-currently or counter-currently. In both cases, it is intended that a stable two phase mixture (gas/fluid) flows through the column. The column should be constantly flooded and any break-up of the fluid flow should be avoided. Kreysa et al. show that under the stated conditions a waste gas containing 5000 ppm of chlorine may be depleted to 50 ppm of chlorine using a $K_2SO_4$ catholyte solution and a current of 15 A. A gas containing 0.8 vol. of $SO_2$ could be depleted to 200 ppm of $SO_2$ by anodic oxidation.

The above-mentioned process together with various embodiments of electrolysis cells suitable for this purpose are described by Kreysa in DE-OS 29 01 577. Such cells have electrode compartments with associated electrodes separated by a diaphragm, wherein at least one electrode is in the form of a fixed bed electrode. Two or more anodes and cathodes may also be combined in the manner of a filter press. It is also possible to arrange two or more counterelectrodes with counterelectrode compartments and diaphragms within a single relatively large fixed bed electrode.

A disadvantage of the process according to Kreysa et al. is the high residual contaminant content in the purified gas. In the case of chlorine, for example, the residual content is approximately ten times above Germany's admissible limit of 5 ppm. The described process for the purification of a gas containing chlorine also gives rise to a hydrochloric acid containing $K_2SO_4$, which must be disposed. However, an aqueous HCl solution may also be used as the catholyte according to DE-OS 29 01 577.

An object of the invention is to provide an improved process for the removal of gaseous contaminants from gases which does not exhibit the disadvantages of the known process of the same generic type as described above. Another object is to achieve a better degree of purification and to achieve a residual concentration of pollutants that complies with legislative requirements. Another object is to provide a more simple process than the above-mentioned processes and to make no greater technical demands than the prior art processes.

SUMMARY OF THE INVENTION

In achieving the above and other objects, a feature of the invention is a process for the electrolytic removal of contaminants from gases, wherein the gas and a liquid electrolyte are passed co- or counter-currently through a fixed bed electrode of an electrolysis cell, which has a counterelectrode and counterelectrode compartment separated from the fixed bed electrode by a separator, and the contaminant is electrochemically converted at an effective cell voltage. The fixed bed electrode operates as a trickle bed reactor.

BRIEF DESCRIPTION OF THE INVENTION

The present invention will be further understood with reference to the drawings, wherein.

DETAILED DESCRIPTION OF INVENTION

Figure 1:
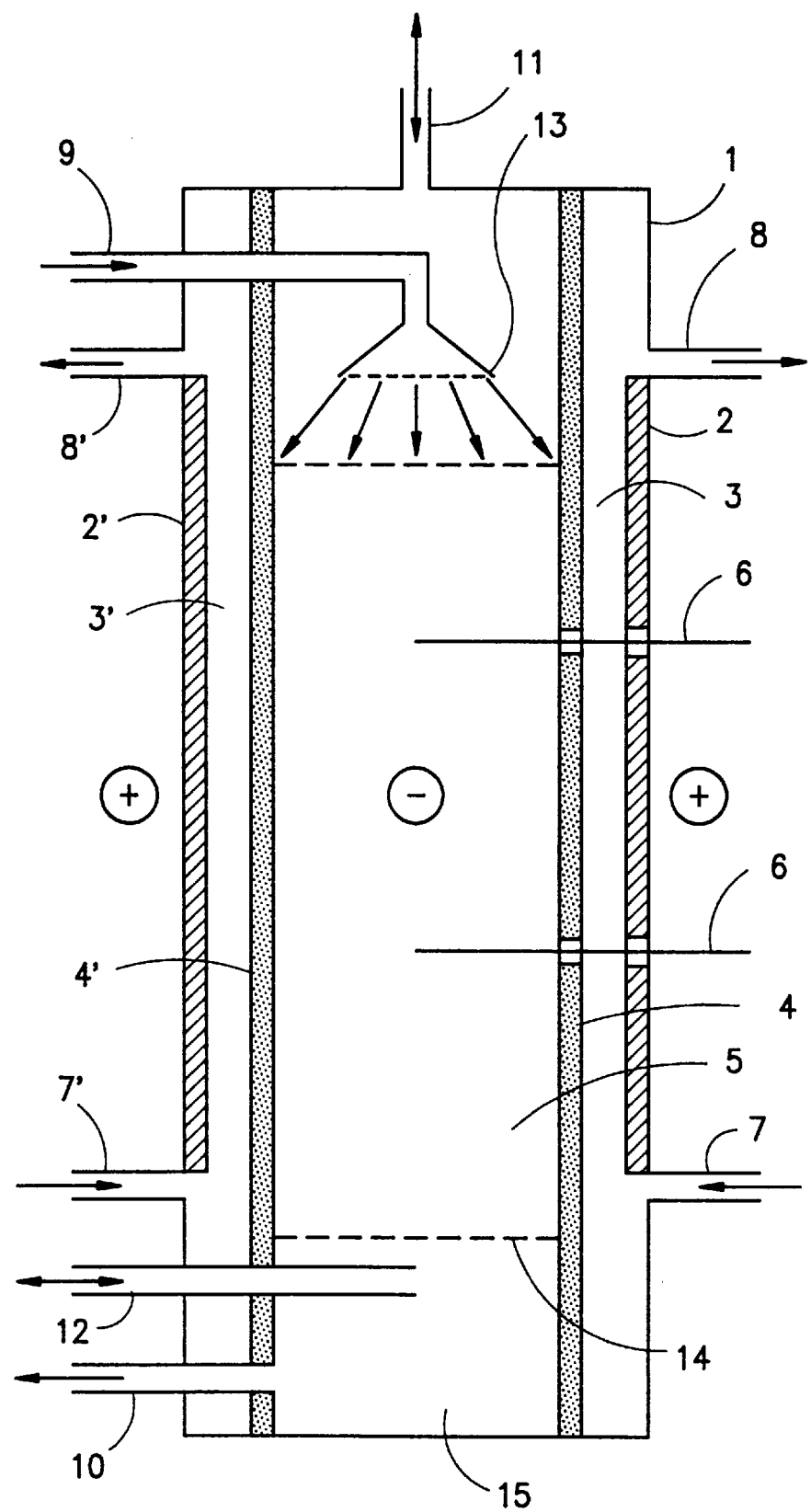
FIG. 1 is a schematic sectional view of a cell according to the invention.

The process according to the invention may be used to purify gases which contain contaminants which may be oxidized or reduced under electrolytic conditions. Reducible contaminants, such as halogens and in particular chlorine, may be virtually quantitatively removed from the gas by passing them over a fixed bed arranged as a fixed bed cathode and trickling an aqueous catholyte, in particular an aqueous hydrohalic acid, through this fixed bed; oxygen is formed at the anode from the aqueous anolytes located there. Oxidizable contaminants, such as sulphur dioxide, nitrogen oxides ($NO_x$) and oxidizable organic compounds, such as formaldehyde, may be removed from gases contaminated therewith by passing the gas and an anolyte through a fixed bed anode. The contaminants to be removed from the gas must be at least partially soluble in the electrolytes trickling through the fixed bed and be electrochemically convertible.

It is an essential feature of the invention that the electrolyte, which absorbs the gas contaminant, trickles through the fixed bed electrode. The fixed bed electrode is thus operated as a trickle bed. While Kreysa et al. (Ger. Chem. Eng. 6 (1983) 325–336, in particular page 329) explicitly state that a stable two phase flow must be maintained within the fixed bed electrode during electrolysis keeping the fixed bed electrode in a flooded state, the fixed bed electrode of the invention is constantly operated in the unflooded state. The electrolyte forms a liquid film having a large exchange area on the particles in the fixed bed electrode. By virtue of this enlarged exchange area, material exchange between the liquid and the contaminants of the gas is improved and a substantially greater degree of purification of the gas is achieved. By operating the fixed bed electrode as a trickle bed, the pressure loss within the trickle bed is only a fraction of that which must be overcome when operating a flooded fixed bed electrode.

The gas to be purified and the electrolyte which absorbs the contaminants may be passed through the fixed bed electrolyte either co-currently or counter-currently. In either case, however, the electrolyte trickles from the top downwards through the electrode bed. The gas and electrolyte are particularly preferably passed countercurrently. In this manner, the trickle density (quantity of electrolyte per unit cross-sectional area per hour) and the quantity of gas flowing in the opposite direction are adjusted to each other in such a manner that flooding does not occur. While the descending electrolyte is introduced from above, a counter electrolyte is introduced below.

The process according to the invention is performed in an electrolysis cell which has an anode, a separator between the cathode and anode together with an cathode compartment and an anode compartment. At least one of the electrodes is arranged as a fixed bed located in the corresponding electrode compartment. The electrolysis cell with a fixed bed electrode may be arranged in a form, in particular tubular or plate-like, which is generally conventional for electrolysis cells. In a tubular arrangement, one electrode with its electrode compartment and a separator is preferably located in the center of a bed of conductive particles forming the fixed bed electrode. Instead of a single counter-electrode in the center of a bed of a relatively large cross-section, it is also possible to arrange two or more counterelectrodes in tubular or pocket form therein, each with their own electrode compartment and separator; the counterelectrodes are electrically short circuited together. As is known from DE-OS 29 01 577, two or more plate-like electrolysis cells may be combined.

In order to remove oxidizable and reducible gas contaminants, the gas to be purified may be passed in succession through an electrolysis cell with a fixed bed cathode and then an electrolysis cell with a fixed bed anode. The above-stated two electrolysis cells may, however, also be combined into a bipolar filter press unit in which the anodic fixed bed electrode and the cathodic fixed bed electrode are separated from a bipolar counterelectrode by seperators.

Electrical contact with the fixed bed electrode may be provided by contact rods, grids or plates, or a combination of such contact means. Where the fixed bed electrode is in the form of a cylinder having a round cross-section, it is convenient to provide electrical contact by means of a cylindrical jacket electrode. Suitable materials for providing electrical contact are Tantalum (Ta), Zirconium (Zr), Niobium (Nb) and in particular Titanium (Ti).

FIGS. 2a to 2d, described below, show four different structures of an electrolysis cell having different contact means. It has been established that, in electrolysis cells having a sheet-like counterelectrode, it is better to provide electrical contact by means of an opposing sheetlike or reticulate contact means rather than with contact rods.

A particularly preferred embodiment of an electrolysis cell to be used according to the invention (see FIGS. 2c and 2d) comprises a fixed bed electrode having a rectangular cross-section, which on each of two opposing longitudinal sides has a counterelectrode with a counterelectrode compartment separated by a diaphragm; the two counterelectrodes are electrically short circuited. In this latter embodiment, it is particularly convenient, in order to provide electrical contact with the fixed bed electrode, to arrange a grid of a metal resistant to corrosion under electrolysis conditions within the fixed bed electrode and substantially parallel to the opposing counterelectrodes.

The fixed bed electrode comprises a bed of particles made from a corrosion-resistant material, in particular a metal, graphite, or a non-conductor provided with an electrically conductive coating. Selection of the material for the fixed bed electrode is guided by the corrosion resistance of the material under electrolysis conditions and the material's resistance to constituents of the gas to be purified. Packings made from graphite or a valve metal, in particular tantalum and titanium, are preferably suitable as a fixed bed cathode. Packings based on graphite and noble metals are particularly suitable as a fixed bed anode. Substantially any packings conventional in absorption applications may be used for the fixed bed electrode, provided that they have the necessary conductivity and a sufficiently high surface area per unit volume and are resistant to corrosion. Conventional packings are in the form of saddles, rods, spirals, and Raschig rings. It is convenient in the process according to the invention to use packings for the fixed bed electrode which, on the one hand, have the highest possible surface area per unit volume and, on the other hand, do not cause excessively high pressure loss within the fixed bed. Particles having a diameter in the range between 2 and 5 mm are particularly preferred.

The shape of the counterelectrode is substantially determined by the structure of the electrolysis cell. Counterelectrodes may accordingly be used in the form of a sheet, a mesh or grid, and in the form of a rod.

The separator between the two electrodes of the electrolysis cell (at least one electrode compartment is at least partially filled by the fixed bed electrode) may consist of a mechanical separation system, for example made from porous plastic or ceramic, or from an ion exchange membrane. A separator made from an ion exchange membrane is particularly preferred. In general, a cation exchange membrane is used. Cation exchange membranes based on aliphatic perfluorinated polyethersulphonic acids are particularly suitable for the purification of waste gases contaminated with chlorine. The ion exchange membrane is preferably used in the form of a film or in the form of a very thin membrane applied onto a porous support.

The catholyte and anolyte must have sufficient conductivity. Aqueous acids, bases, or aqueous salt solutions may be used. Aqueous acids are preferably used both as the catholyte and as the anolyte. When purifying a gas by reducing the chlorine contained therein using a fixed bed cathode, it is preferable to use aqueous hydrochloric acid. In the process according to the invention this acid becomes more concentrated and may be reutilized for other purposes.

Electrolysis is performed by applying a current and increasing its intensity until an effective voltage is achieved. Electrolysis is conventionally performed at a current in the range from 3 to 20A, in particular in the range of 3 to 10A, and a voltage in the range from 2 to 6V. The effective current density and potential decrease as bed depth increases. The person skilled in the art can easily determine optimum bed depth by initial investigatory testing.

The process according to the invention may preferably be used to separate chlorine from gases in an electrolysis cell according to FIG. 1 which is a schematic longitudinal section through the cell. The references numbers on the Figure have the following meanings: electrolysis cell (1); anode (2 and 2'); anode compartment (3 and 3'); cation exchange membrane (4 and 4'); fixed bed cathode (5); contact rods (6); anolyte feed (7 and 7'); anolyte outlet (8 and 8'); catholyte feed (9); catholyte outlet (10); gas inlet and outlet (11 and 12); trickle distributor (13); perforated supporting plate (14); catholyte collecting chamber (15).

Figure 2A:
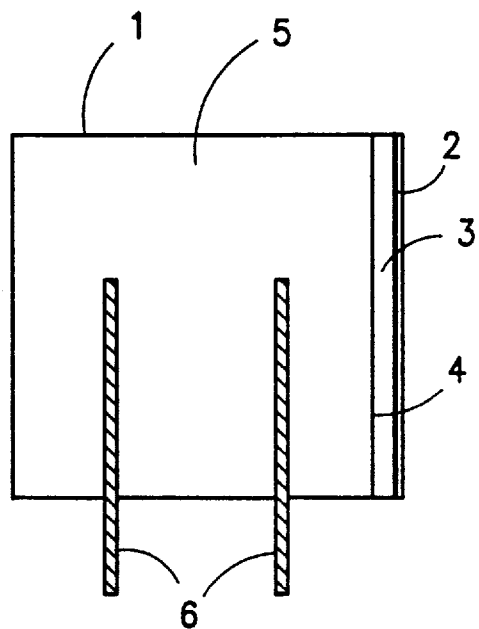
FIGS. 2a–2d are schematic views of four different cell configurations.
Figure 2B:
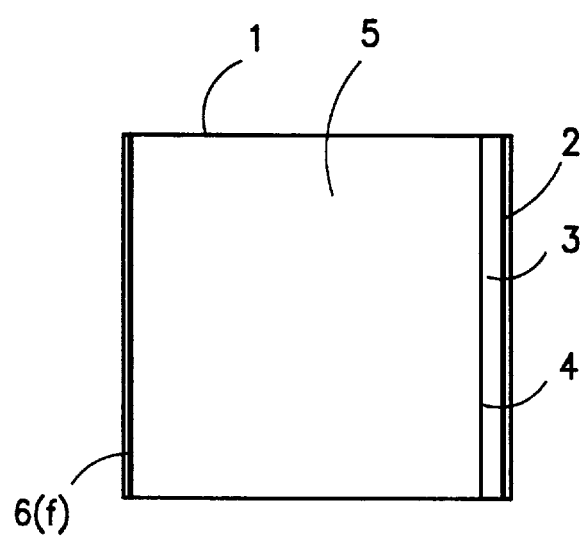
Figure 2C:
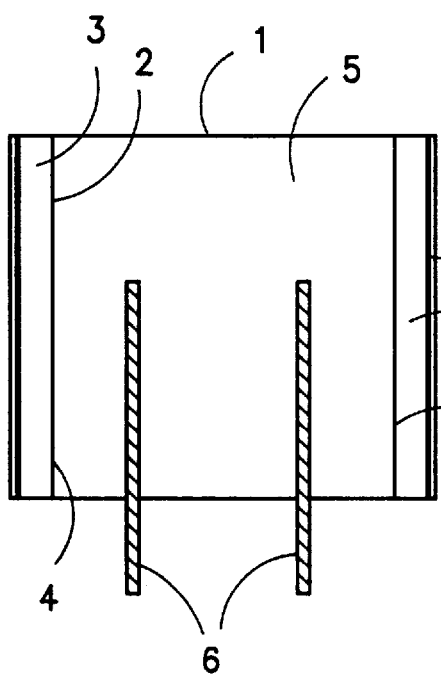
Figure 2D:
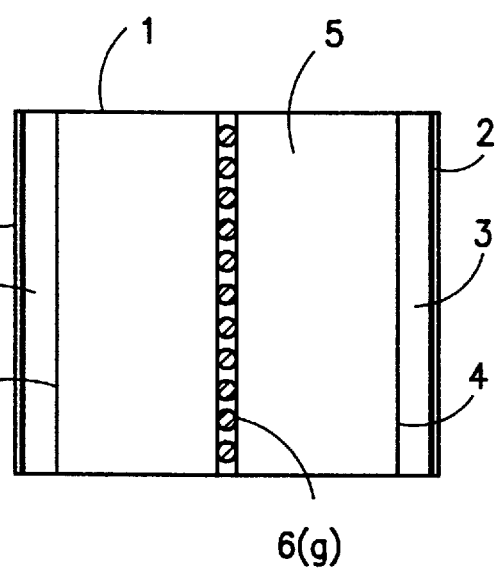

FIGS. 2a, 2b, 2c, and 2d are schematic diagrams of four different cell configurations with a cross-section of a fixed bed cathode (top view), as were used in the Examples that follow: cell (1) Cl in FIG. 2a contains a cathode compartment with a fixed bed cathode (5), a diaphragm (4), an anode compartment (3), an anode (2) and Ti rods (6) to provide electrical contact. Cell C2 in FIG. 2b corresponds to C1, but contains a platinum foil (6f) to provide electrical contact. Cell C3 in FIG. 2c contains a cathode compartment with the fixed bed cathode (5), two opposing anode compartments (3) and (3') with anodes (2) and (2') and diaphragms (4) and (4') and Ti rods (6) to provide electrical contact with the fixed bed. Cell C4 in FIG. 2d corresponds to cell C3, but contains instead of the contact rods a Ti grid (6g) in the middle of the fixed bed cathode parallel to the anode compartment in order to provide electrical contact.

Advantages of the process according to the invention are the substantially greater degree of purification in comparison with prior art process, simple handling of the fixed bed electrode operated as a trickle bed, lower pressure loss and consequently lower energy requirements. Another advantage is that the ratio of the volumetric flow rate of the gas to be purified to the scrubbing solution trickling through the fixed bed and acting as electrolyte and absorbent could be raised, to increase the space/time yield.

The examples illustrate the invention in greater detail.

EXAMPLES

Purification of a gas containing chlorine as the contaminant was investigated.

Purification was performed using electrolysis cells having a cell structure C1, C2, C3 and C4 according to FIGS. 2a, 2b, 2c, and 2d. The cell cross-section was 37.8 cm$^2$ (C1, C2 and C3) or 31.5 cm$^2$ and 60 cm$^2$ (C4). A bed of graphite particles having the particle size and surface area per unit volume stated in the tests was used as the fixed bed cathode. The height of the bed was between 31.5 and 42 cm. Electrical contact was provided by titanium rods (C1 and C3), a Pt foil (C3) and a titanium grid (C4). A conventional commercial cation exchange membrane (Nafion membrane) was used in each case as the separator. A Nafion membrane is a cation exchange membrane made from polytetrafluoroethylene containing sulfo groups. A platinum sheet acted as the anode. The catholyte used was an aqueous hydrochloric acid (0.5 mol/l), while the anolyte was an aqueous $H_2SO_4$ solution (0.5 mol/l). Electrolysis was performed with a current of between 3 and 10A. The catholyte flow rate (l/h) or trickle density (m$^3$/m$^2$·h) (=flow rate of catholyte per unit of cross-sectional area of the bed), together with the gas flow rate (l/h) or gas flow density (m$^3$/m$^2$·h) and the residual chlorine concentration or degree of depletion may be found in the tables 1, 2 and 3.

EXAMPLES 1 TO 4

$Cl_2$ content in test gas was 0.102 vol. %;

packing: graphite particles dm=approx. 3 mm; cell Cl;

bed height 42 cm;

temperature: approx. 20° C.;

counter-current: Examples 1, 2 and 4; co-current: example 3.

TABLE 1

| Example no. | 1 | 2 | 3 | 4 |
|---|---|---|---|---|
| Current (A) | 10 | 10 | | |
| Voltage (V) | 5.3 | 5.1 | Current 10 A | Current 10 A |
| Volumetric flow rate of gas (1/h) | 300 | 300 | 238 | 238 |
| Flow rate of catholyte (1/h) | 30.2 | 30.2 | 30.2 | 30.2 |
| Trickle density (m$^3$/m$^2$·h) | 8.0 | 8.0 | 8.0 | 8.0 |
| $Cl_2$ content (mg/m$^3$) (after purification) | 0 | 2 | | |
| $Cl_2$ depletion (%) | 100 | 99.92 | 99.48 | 100 |
| Comment | | | Co-current | Counter-current |

Examples 1 and 2 demonstrate the unforeseen virtually quantitative depletion of chlorine brought about by trickle bed operation.

Comparison of Examples 3 and 4 shows that counter-current operation is more effective than co-current operation with regard to the degree of depletion.

EXAMPLES 5 AND 6

Examples 5 and 6 (see Table 2) clarify the influence of the surface area per unit volume Ov (m$^2$/m$^3$) of the packing (in approximate terms, Ov=6/dm, where dm=average particle diameter).

Trickle density: 8 m$^3$/m$^2$·h;

gas flow density: 168 m$^3$/m$^2$·h;

cell: C4, cross-section 60 cm$^2$, height 39 cm test gas concentration: 0.1 vol. % $Cl_2$ current operation: 10A; counter-current.

TABLE 2

| Example | 5 | 6 |
|---|---|---|
| Packing: Ov (m$^2$/m$^3$) | 1320 | 1950 |
| Degree of purification (%) | 99.00 | 99.88 |

The comparison shows that a greater degree of purification is achieved in the trickle bed operation according to the invention with particles having a greater surface area per unit volume.

EXAMPLES 7 TO 10

The degree of $Cl_2$ depletion was determined as a function of gas flow density (m$^3$/m$^2$·h) using the different cell configurations C1 to C4.

Packing (graphite) having dm=approx. 3 mm;

test gas concentration: 0.1 vol. % $Cl_2$;

trickle density: 8 to 12 m$^3$/m$^2$·h;

current: 10A.

The results may be found in Table 3. Cell configurations C3 and in particular C4 exhibited unexpectedly high efficiency up to high gas flow densities (volumetric flow rate per unit cross-section).

TABLE 3

| Gas flow density $(m^3/m^2 \cdot h)$ | 79 | 95 | 133 | 145 | 162 | 179 | 196 | 214 | 320 | 364 |
|---|---|---|---|---|---|---|---|---|---|---|
| Percentage depletion in cell | | | | | | | | | | |
| C1 (Ex. 7) | 99.96 | 99.52 | 93.89 | | | | | | | |
| C2 (Ex. 8) | | 99.97 | | 99.28 | | | | | | |
| C3 (Ex. 9) | | 100 | | | 100 | 99.94 | 99.56 | | | |
| C4 (Ex. 10) | | | 100 | | 100 | | | 99.96 | 99.94 | 99.92 |

Further variations and modifications of the foregoing will be apparent to those skilled in the art and are intended to be incorporated by the claims appended hereto.

German priority application 195 31 707.6 is relied on and incorporated herein by reference.

What is claimed:

1. A process of electrolytically removing a contaminant from gas, which comprises:

passing contaminated gas over a fixed bed electrode of an electrolysis cell having at least one fixed bed electrode;

trickling a liquid electrolyte co- or counter-currently to said contaminated gas downward through said fixed bed electrode;

said contaminant in said contaminated gas being at least partially soluble in said liquid electrolyte;

said electrolysis cell having a counter-electrode and counter-electrode compartment separated from the fixed bed electrode and a corresponding electrode compartment by a separator;

said fixed bed electrode operating as a trickle bed reactor operating in an unflooded state;

providing electrical contact means with said fixed bed electrode;

electrochemically converting contaminant in said contaminated gas which is absorbed by said electrolyte at an effective cell voltage to an oxidized or reduced compound.

2. The process according to claim 1 further comprising a counter-electrolyte in the electrolysis cell.

3. The process according to claim 1, wherein said fixed bed electrode comprises a bed of packing made from corrosion-resistant metal, graphite, or a non-conductor provided with an electrically conductive coating.

4. The process according to claim 1, wherein said counter-electrode is in the form of a sheet, a mesh, a grid, or a rod.

5. The process according to claim 1, wherein said separator between the fixed bed electrode and the counter electrode comprises a mechanical separation system which is a porous plastic or ceramic, or an ion exchange membrane.

6. The process according to claim 1, wherein said electrolytes are aqueous acids, bases, or aqueous salt solutions.

7. The process according to claim 1, wherein said step of electrochemically converting contaminant is carried out at 3–20A, and a voltage in the range of 2–6V.

8. The process according to claim 1, wherein said contaminated gas contains reducible contaminants;

said fixed bed is a fixed bed cathode;

said liquid electrolyte is an aqueous catholyte.

9. The process according to claim 8, wherein said reducible contaminant is chlorine;

said aqueous catholyte is aqueous hydrochloric acid.

10. The process according to claim 9, wherein said separator is a cation exchange membrane based on aliphatic perfluorinated polyethersulphonic acids;

said cation exchange membrane is a film or a thin membrane on a porous support.

11. The process according to claim 9, which further comprises:

obtaining a more concentrated aqueous catholyte;

reutilizing said concentrated aqueous catholyte.

12. The process according to claim 9, wherein a cross section of said electrolysis cell has a first longitudinal side and a second longitudinal side;

said electrolysis cell having said fixed bed electrode and said corresponding electrode compartment positioned along said first side and said counter-electrode and said counter-electrode compartment positioned along said second side;

said fixed bed electrode and said electrode compartment are separated from said counter-electrode and counter-electrode compartment by a diaphragm;

said electrode and counter-electrode are electrically short-circuited;

said contact means comprising a grid of corrosion-resistant metal within said fixed bed electrode and substantially parallel to said counter-electrode.

13. The process according to claim 1, wherein said contaminated gas contains oxidizable contaminants;

said fixed bed is a fixed bed anode;

said liquid electrolyte is an aqueous anolyte.

14. The process according to claim 13, wherein said oxidizable contaminants are at least one member selected from the group consisting of sulphur dioxide, nitrogen oxides, and oxidizable organic compounds.

15. The process according to claim 1, wherein a cross section of said electrolysis cell has a first longitudinal side and a second longitudinal side;

said electrolysis cell having said fixed bed electrode and said corresponding electrode compartment positioned along said first side and said counter-electrode and said counter-electrode compartment positioned along said second side;

said fixed bed electrode and said electrode compartment are separated from said counter-electrode and said counter-electrode compartment by a diaphragm;

said electrode and counter-electrode are electrically short-circuited;

said contact means comprising a grid of corrosion-resistant metal within said fixed bed electrode and substantially parallel to said counter-electrode.

16. Process for electrolytically removing chlorine from gas, comprising:

passing contaminated gas at a flow rate of 238–300 l/h over a fixed bed cathode of an electrolysis cell having at least one fixed bed electrode;

said fixed bed electrode comprises a bed of packing made from graphite having a particle diameter of 3 mm, with said fixed bed electrode having a bed depth of 31.5–42 cm;

trickling liquid hydrochloric acid catholyte (0.5 mol/l) at a rate of 30.2 l/h counter-currently or co-currently to said contaminated gas downward through said fixed bed electrode at a trickle density of 8.0 $m^3/m^2 \cdot h$;

said electrolysis cell having an anode made from platinum sheet and an anode compartment separated from the fixed bed electrode by a cation exchange membrane;

said anode compartment containing an anolyte of aqueous $H_2SO_4$ solution (0.5 mol/l);

said electrolysis cell having a temperature of 20 degrees C.;

said fixed bed electrode operating as a trickle bed reactor operating in an unflooded state;

providing electrical contact means with said fixed bed electrode;

electrochemically converting contaminant in said contaminated gas at 3–10A and 5.1–10V to form an oxidized or reduced compound;

said electrical contact means are titanium rods or grids, or platinum foil.

17. The process according to claim 16 wherein said cation exchange membrane is made from sulfo groups containing polytetrafluoroethylene.

18. A process for electrolytically removing a contaminant from gas comprising passing contaminated gas over a fixed bed cathode of a first electrolysis cell, trickling a liquid catholyte co- or counter-currently to said contaminated gas downward through said fixed bed cathode, subsequently passing said contaminated gas over a fixed bed anode of a second electrolysis cell, trickling a liquid anolyte co- or counter-currently to said contaminated gas upward through said fixed bed anode, said contaminant containing at least one reducible contaminant or oxidizable contaminant or both, said reducible contaminant is at least partially soluble in said catholyte, said oxidizable contaminant is at least partially soluble in said anolyte, at least one of said fixed bed anode or fixed bed cathode operating as a trickle bed reactor in an unflooded state, providing electrical contact means with said fixed bed anode and said fixed bed cathode, electrochemically reducing said reducible contaminants in said catholyte to a reduced compound, and electrochemically oxidizing said oxidizable contaminants in said anolyte to an oxidized compound.

19. The process for removing contaminants according to claim 18 wherein said first and second electrolysis cell are combined into a dipolar filter press unit;

said dipolar filter press unit containing a dipolar counter-electrode;

said fixed bed anode and said fixed bed cathode are separated from said dipolar counter-electrode by a diaphragm.

* * * * *